(No Model.)
A. SCHUBERT.
HAND CART.
No. 401,381. Patented Apr. 16, 1889.
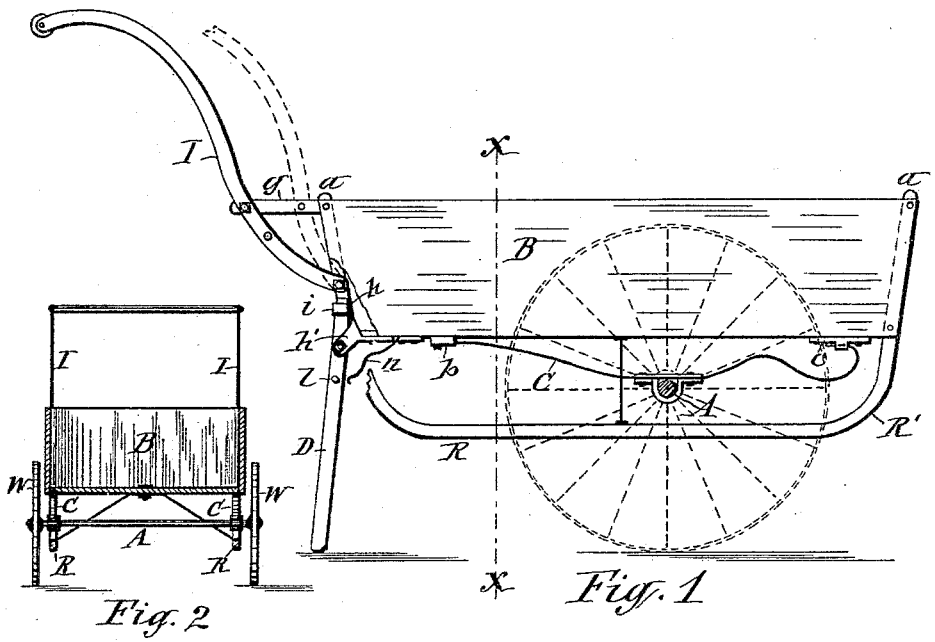
Fig. 1
Fig. 2
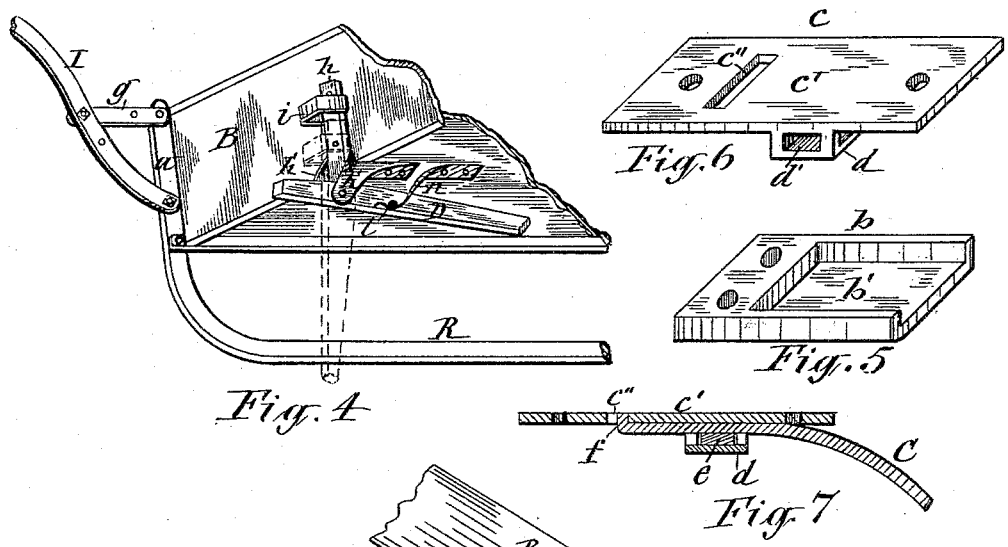
Fig. 4
Fig. 6
Fig. 5
Fig. 7
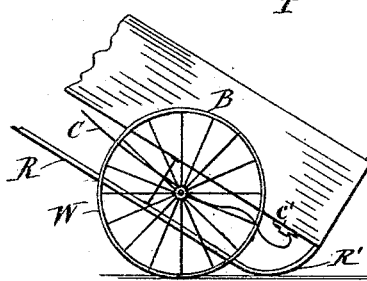
Fig. 3
WITNESSES:
A. F. Walz
Mark W. Dewey.
INVENTOR:
August Schubert
BY
Duell, Laass & Duell
ATTORNEYS.

UNITED STATES PATENT OFFICE.

AUGUST SCHUBERT, OF ONEIDA, NEW YORK.

HAND-CART.

SPECIFICATION forming part of Letters Patent No. 401,381, dated April 16, 1889.

Application filed December 17, 1888. Serial No. 293,816. (No model.)

*To all whom it may concern:*

Be it known that I, AUGUST SCHUBERT, of Oneida, in the county of Madison, in the State of New York, have invented new and useful Improvements in Hand-Carts, of which the following, taken in connection with the accompanying drawings, is a full, clear, and exact description.

This invention relates to the class of carts which are provided with runners adapted to be used interchangeably with the wheels; and the invention consists in the novel construction and combination of parts, as hereinafter described, and specifically set forth in the claims.

In the annexed drawings, Figure 1 is a side elevation of a cart embodying my invention, a portion of the body being broken away to show the attachment of the leg. Fig. 2 is a vertical transverse section on line $x$ $x$, Fig. 1, on a reduced scale. Fig. 3 is a side elevation of the front portion of the cart in a tilted position. Fig. 4 is an enlarged perspective view of a portion of the rear end of the cart-body, illustrating more fully the attachment of the leg. Figs. 5 and 6 are enlarged detached perspective views of the shoes by which the springs are connected to the body, and Fig. 7 is a vertical longitudinal section of one of the ends of the spring and its attaching plate or shoe.

Similar letters of reference indicate corresponding parts.

B represents the body or box of the cart, to which are either detachably or permanently attached the runners R R, which are curved upward at both ends and are preferably formed integral with and terminate with the cornerposts $a$ $a$, to which the sides and ends of the body are secured. By the upward curvature of the front ends of the runners R R and rigid connection of the same with the body I provide the cart with longitudinal bearings R' below the body and in front of the wheels, upon which bearings the cart rolls when tilted endwise, as illustrated in Fig. 3 of the drawings. This rolling bearing greatly facilitates the operation of so tilting, loading, and unloading the cart when desired. Said body is carried on side springs, C C, which are firmly secured to the axle A of the carrying-wheels.

In order to allow the cart to be moved on the runners R R when desired, I make the springs C C detachable from the body B by attaching to the under side of the body, near each end thereof, the shoes $b$ and $c$. The shoe $b$ is formed with the recess $b'$ in the side facing the body, as shown in Fig. 5 of the drawings, and the shoe $c$ consists of a base-plate, $c'$, formed with a loop, $d$, on its under side and with a transverse slot, $c''$, and slots $d'$ in the sides of the loop, as shown in Fig. 6 of the drawings.

The spring C has its rear end inserted into the recess $b'$ of the shoe $b$, and the front end of the spring is curved upward and backward and terminated with an upward-projecting hook, $f$. This end of the spring passes through the loop $d$ of the shoe $c$ and has the hook $f$ inserted into the slot $c''$, in which it is retained by a key, $e$, passing through the slots $d'$ and across the under side of the spring, as illustrated in Fig. 7 of the drawings. When it is desired to remove the wheels W W from the cart, the springs C C are to be detached from the body B by withdrawing the keys $e$, which allows the front ends of the springs to be withdrawn from the slots $c''$ and loops $d$ of the shoes $c$. The rear ends of the springs slip at the same time out of the recesses $b'$ of the shoes $b$.

D represents the leg by which to support the body in a horizontal position when at rest. This leg D hinges to ears $h'$ $h'$, formed on a bracket, $h$, which is attached to the rear end of the body, preferably at the bottom corner thereof, and on the vertical arm of said bracket slides a sleeve, $i$, which is adapted to be slipped over the upper end of the leg and confines the same in its erect position, as shown in Fig. 1 of the drawings and indicated by dotted lines in Fig. 4.

To the under side of the body B is attached a spring-catch, $n$, which is adapted to engage the leg below its hinge, or a pin, $l$, projecting from the side of the leg thereat, and thereby retain said leg swung up under the body, as shown in Fig. 4 of the drawings.

I I denote the handles, which I hinge to the rear end of the body B. Each of said handles is perforated at different points in its length, and to the body B, I hinge stays $g$, each of which is also perforated at intervals of its length, and by a pin or bolt passing through one of the perforations in the handle and in the stay the free end of the handle is supported at the desired elevation.

Having described my invention, what I claim as new, and desire to secure by Letters Patent, is—

1. The combination of the runners curved upward at both ends and integral with the posts $a\ a$, the sides and ends of the body attached to said posts, springs detachably connected to the body, an axle attached to said springs, and wheels mounted on said axle, substantially as described and shown.

2. In combination with the body B and axle A, shoes attached to the body, and the longitudinal springs C C, secured intermediate of their ends to the axle and having their ends removably inserted into the aforesaid shoes, substantially as set forth.

3. In combination with the body B and axle A, the shoe $b$, secured to the body near one end thereof and provided with the recess $b'$, the shoe $c$, secured to the body near the opposite end thereof and consisting of the base-plate $c'$, formed with the loop $d$, and the side spring, C, having one end inserted into the recess $b'$ of the shoe $b$ and the opposite end curved upward and backward and passing through the loop $d$ and detachably confined therein, as set forth.

4. In combination with the body B and axle A, the shoe $b$, secured to the body near one end thereof and provided with the recess $b'$, the shoe $c$, secured to the body near the opposite end thereof and consisting of the base-plate $c'$, formed with the loop $d$, transverse slot $c''$, and side slots, $d'$, the side spring, C, having one end inserted into the recess $b'$ and the opposite end curved upward and backward and terminated with the hook $f$ and passing through the loop $d$ and hooked into the slot $c''$, and the key $e$, inserted into the slots $d'$, substantially as described and shown.

5. In combination with the body, the handles I, hinged thereon and perforated at different points in their length, and the stays $g$, hinged on the body and perforated at intervals of their lengths, and bolts or pins passing through the perforations of the stays and handles, substantially as described and shown.

6. In combination with the cart-body, the bracket $h$, formed with ears $h'\ h'$, the leg D, hinged on said ears, the sleeve $i$, sliding on the bracket and over the upper end of the leg, and the catch $n$, secured to the body and adapted to engage said leg below its hinge, substantially as described and shown.

In testimony whereof I have hereunto signed my name, in the presence of two witnesses, at Oneida, in the county of Madison, in the State of New York, this 14th day of December, 1888.

AUGUST SCHUBERT. [L. S.]

Witnesses:
T. H. JURDEN,
NELSON T. STARK.